(12) United States Patent
Chen et al.

(10) Patent No.: US 8,289,452 B2
(45) Date of Patent: Oct. 16, 2012

(54) METHOD AND SYSTEM FOR DETERMINING VIDEO DEINTERLACING SCHEME BY CHECKING COMBING PHENOMENON

(75) Inventors: Tsui-Chin Chen, Hsinchu (TW); Wei-Jen Lo, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 1353 days.

(21) Appl. No.: 11/692,929

(22) Filed: Mar. 29, 2007

(65) Prior Publication Data

US 2008/0111917 A1   May 15, 2008

(30) Foreign Application Priority Data

Nov. 14, 2006   (TW) ............................... 95142034 A

(51) Int. Cl.
*H04N 5/00* (2011.01)

(52) U.S. Cl. ........ 348/609; 348/607; 348/615; 348/452; 348/451; 348/448

(58) Field of Classification Search ................ 348/441, 348/448, 451, 452, E5.109, 607, 609, 615
See application file for complete search history.

(56) References Cited

U.S. PATENT DOCUMENTS

| | | | |
|---|---|---|---|
| 6,628,341 B1 * | 9/2003 | Staley et al. | 348/607 |
| 6,633,612 B2 | 10/2003 | Selby | |
| 6,647,062 B2 * | 11/2003 | Mackinnon | 375/240.16 |
| 6,982,764 B1 * | 1/2006 | Heath | 348/580 |
| 7,808,552 B1 * | 10/2010 | Wang et al. | 348/449 |

* cited by examiner

*Primary Examiner* — Jefferey Harold
*Assistant Examiner* — Omer Khalid
(74) *Attorney, Agent, or Firm* — Jianq Chyun IP Office

(57) ABSTRACT

A method and a system for determining a video deinterlacing strategy are disclosed. First, all the pixels of a $(i+2)^{th}$ field are subtracted from the corresponding pixels of the $i^{th}$ field to obtain a difference field. Next, a specific check-area is located according to the difference field. Next, the $i^{th}$ field is combined with the $(i+1)^{th}$ field into a specific frame. Next, the combing phenomenon of the specific check-area in the specific frame is checked to determine the deinterlacing scheme for the pixels in the specific check-area.

12 Claims, 13 Drawing Sheets

METHOD AND SYSTEM FOR DETERMINING VIDEO DEINTERLACING SCHEME BY CHECKING COMBING PHENOMENON

CROSS-REFERENCE TO RELATED APPLICATION

This application claims the priority benefit of Taiwan application serial no. 95142034, filed Nov. 14, 2006. All disclosure of the Taiwan application is incorporated herein by reference.

BACKGROUND OF THE INVENTION

1. Field of the Invention

The present invention generally relates to a video processing technology, and more particular, to a method and a system for determining a video deinterlacing strategy.

2. Description of Related Art

Conventionally, in order to convert an interlaced video into a progressive one, there are three existing deinterlacing methods available: the first method commonly referred to as "bob", the second method referred to as "weave" and the third method referred to as "adaptive motion". In the "bob" method, every field is expanded into a complete frame, wherein the lost line data between any two adjacent scan lines in the field is filled up with the data obtained by interpolating the previous line data and the following line data thereof. As shown in FIG. 14, in order to deinterlace the first field 1401 or the third field 1403, the data of the even lines are used to interpolate the data of the odd lines; in the same way, the data of the odd lines are used to interpolate the data of the even lines so as to deinterlace the second field 1402 or the fourth field 1404. However, the resulting image using "bob" appears to be a variegated mosaic. Even after a proper processing, the image still has a soft-shifted look with an unavoidable resolution loss. In the "weave" method, two adjacent fields, an even field and an odd field are synthesized into a complete frame, i.e., with the algorithm, any two continuous fields are combined into a frame. As shown in FIG. 14, the first field 1401 and the second field 1402, or the second field 1402 and the third field 1403, are combined to form a complete frame. The "weave" method is usually suitable for the situation where the inter-field motion is dinky, for example, for the two continuous fields of a movie frame. However, for the two continuous fields with an inter-field motion, the synthesized frame looks to have combing artefacts.

The "adaptive motion" method is a compromise between the "bob" method and the "weave" method, which includes the advantageous features of the two methods, wherein a motion detection processing is conducted on all the pixel points of the received field, wherein when a pixel point is judged to be in still by the detection, the "weave" deinterlacing is conducted on the point so as to obtain the optimum resolution result, and when a pixel point is judged to be in motion, the "bob" deinterlacing is conducted on the point so as to avoid the combing phenomena. Hence, the quality of the deinterlaced frame by using the "adaptive motion" method mainly depends on the motion detection capability.

In the prior art, there are two schemes of motion detection, namely frame motion detection and field motion detection. FIG. 16A is a diagram showing the conventional frame motion detection method. Referring to FIG. 16A, there are four fields F161-F164 herein. According to the frame motion detection method, the pixels 1601 and 1602 located at the same position in the same fields (for example, F162 and F164) are judged whether they are in motion. When the differential value of the pixels 1601 and 1602 is greater than a preset value, the pixel 1602 would be judged to be in motion, and the pixels 1602 and 1603 are accordingly used for conducting a "bob" algorithm to obtain a pixel 1604.

FIG. 16B is a diagram showing the conventional field motion detection method. Referring to FIG. 16B, there are also four fields F161-F164 herein. According to the field motion detection method, in order to judge whether the pixels 1605 and 1606 in a field F161 are in motion, the pixel 1607 adjacent to the pixels 1605 and 1606 in the field adjacent to the field F161 (for example, F162) is used. When the differential value of the pixels 1607 and 1605 and the difference value of the pixels 1607 and 1606 are greater than a preset value, the pixel 1607 in the field F162 and the pixels 1605 and 1606 in the field F161 are judged to be in motion; otherwise, they are judged to be still. For the "still" judgement, a "weave" method is applied, that is to say, the pixels 1605 and 1606 would directly combine with the pixel 1607.

However, there are a couple of problems in the above-mentioned conventional motion detection schemes in selecting a proper deinterlacing algorithm. FIG. 1 is a diagram of conventional virtual still, wherein 101 and 103 are odd fields, while 102 and 104 are even fields. It can be seen that the sampled points on the sunroof in the fields 103 and 101 along a sampling trace 105 appear white, while the corresponding sampled points in the fields 102 and 104 appear black. If the frame motion method is used to compare the adjacent odd fields (for example, the field 101 is compared with the field 103) or the adjacent even fields (for example, the field 102 is compared with the field 104) herein, the wrong comparison result of "still" would be given, which leads to combination of the fields 101-104 in FIG. 1 and results in the field result as shown by 202 in FIG. 2. In the field 202 in FIG. 2, a serious combing occurs with the sunroof portion. On the contrary, if the field motion method is used to compare the adjacent odd and even fields (for example, the field 101 is compared with the field 102, or, the field 102 is compared with the field 103) herein, the comparison result of "in motion" would be given, which leads to conduct the "bob" algorithm on the fields of FIG. 1 and results in the field result as shown by 201 in FIG. 2 where no combing occurs with the sunroof portion at all.

FIG. 3 is another diagram of conventional virtual still, wherein 301 and 303 are odd fields, while 302 and 304 are even fields. It can be seen that the sampled points on the "O" mark in the fields 303 and 301 along a sampling trace 305 appear white, while the corresponding sampled points in the fields 302 and 304 appear black; on the other hand, the sampled points on the "K" mark in the fields 303 and 301 appear black, while the corresponding sampled points in the fields 302 and 304 appear white. If the field motion method is used to compare the adjacent odd and even fields (for example, the field 301 is compared with the field 302, or, the field 303 is compared with the field 304) herein, the wrong comparison result of "in motion" would be given, which leads to conduct the "bob" algorithm on the fields 301-304 of FIG. 3 and results in the field result as shown by 401 in FIG. 4 where a serious flicker artefact occurs with the "OK" mark.

In short, if the conventional frame motion is conducted on the adjacent same fields (odd fields or even fields) to judge whether a frame is "in motion", then, for the case of the input fields 301-304 of FIG. 3, the right result as shown by 402 in FIG. 4 is expected (no flicker at all); for the case of the input fields 101-104 of FIG. 1, the wrong result as shown by 202 in FIG. 2 is obtained (serious combing). If the conventional field motion is conducted on the adjacent different fields (odd and even fields) to judge whether a frame is "in motion", then, for the case of the input fields 101-104 of FIG. 1, the right result as shown by 201 in FIG. 2 is expected (no combing); for the case of the input fields 301-304 of FIG. 3, the wrong result as shown by 401 in FIG. 4 is obtained (serious flicker).

Obviously, the conventional technology is limited to deal with one of the above-mentioned cases, FIG. 1 or FIG. 3, and the prior art fails to deal with both the cases simultaneously and correctly. However, in order to obtain the optimum result in practice, any wrong judgement must be avoided; that is to say the case of FIG. 1 and the case of FIG. 3 must be judged as "in motion" and "still", respectively.

SUMMARY OF THE INVENTION

Accordingly, the present invention is directed to a method for determining a video deinterlacing strategy for correctly judging a deinterlacing strategy to promote the frame quality after the video deinterlacing.

The present invention provides a system for determining a video deinterlacing strategy to avoid problems described in the prior art so as to improve the image quality.

As embodied and broadly described herein, the present invention provides a method for determining a video deinterlacing strategy. The method for determining a video deinterlacing strategy may be described as follows. First, all the pixels in a $(i+2)^{th}$ field subtracted from all the corresponding pixels in the $i^{th}$ field to obtain a difference field. Next, a specific check-area is located according to the difference field. Next, the $i^{th}$ field is combined with the $(i+1)^{th}$ field as a specific frame. Next, the specific check-area in the specific frame checked to determine any combing and determine a deinterlacing scheme applied to the pixels in the specific check-area, wherein i is a natural number.

According to an embodiment of the present invention, the step of locating a specific check-area according to the difference field includes defining an enclosed area, wherein all the pixel differences are greater than a preset value as a specific check-area from the above-mentioned difference field. In another embodiment however, the step of "locating a specific check-area according to the difference field" includes defining an enclosed first area wherein all the pixel differences are greater than a preset value plus an extension range as a specific check-area from the difference field.

According to an embodiment of the present invention, the step of checking the specific check-area in the specific frame to determine any combing and determine a deinterlacing scheme applied to the pixels in the specific check-area includes a step of determining whether or not to perform a deinterlacing scheme of "weave" on the pixels when no combing occurs within the specific check-area of the specific frame. In another embodiment however, the step of checking the specific check-area in the specific frame to determine any combing and determine a deinterlacing scheme applied to the pixels in the specific check-area includes a step of determining whether or not to perform a deinterlacing scheme of "bob" on the pixels when any combing occurs within the specific check-area of the specific frame.

According to an embodiment of the present invention, the $i^{th}$ field and $(i+1)^{th}$ field are different types of fields, while the $i^{th}$ field and $(i+2)^{th}$ field are same types of fields.

The present invention provides a system for determining a video deinterlacing strategy. The system includes a pixel difference processing unit, a check-area defining unit, a combing detecting unit and a deinterlacing format determining unit. The pixel difference processing unit receives a $i^{th}$ field and a $(i+2)^{th}$ field and subtracts all the pixels in the $(i+2)^{th}$ field from all the corresponding pixels in the $i^{th}$ field to obtain a difference field. The check-area defining unit receives the difference field and locates a specific check-area according to the difference field. The combing detecting unit receives a $i^{th}$ field and a $(i+1)^{th}$ field for combining the two fields into a specific frame. The deinterlacing format determining unit checks all the pixels within the specific check-area in the specific frame to determine any combing and determine a deinterlacing scheme applied to the pixels in the specific check-area, wherein i is a natural number.

According to an embodiment of the present invention, the check-area defining unit is adapted for defining an enclosed area wherein the pixel differences are greater than a preset value as a specific check-area from the difference field. In another embodiment however, the check-area defining unit is adapted for defining an enclosed first area wherein the pixel differences are greater than a preset value plus an extension range as a specific check-area from the difference field.

According to an embodiment of the present invention, the deinterlacing format determining unit determines whether or not to perform a deinterlacing scheme of "weave" on the pixels when no combing occurs within the specific check-area of the above-mentioned specific frame. According to another embodiment of the present invention, the deinterlacing format determining unit determines whether or not to perform a deinterlacing scheme of "bob" on the pixels when any combing occurs within the specific check-area of the above-mentioned specific frame.

According to an embodiment of the present invention, the above-mentioned $i^{th}$ field and $(i+1)^{th}$ field are the fields in different types, while the $i^{th}$ field and $(i+2)^{th}$ field are the fields in the same type.

Since the present invention locates a specific check-area based on the difference field and checks all the pixels within the specific check-area in a frame synthesized from the adjacent fields to find out any combing and determine a deinterlacing scheme applied to the pixels in the field, therefore, the present invention is superiors not only in assuring to correctly determine a video deinterlacing strategy, but also in avoiding a possible mistake in determining a video deinterlacing strategy as in the case of the prior art. Thus, the frame quality after video deinterlacing can be effectively promoted.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 3:
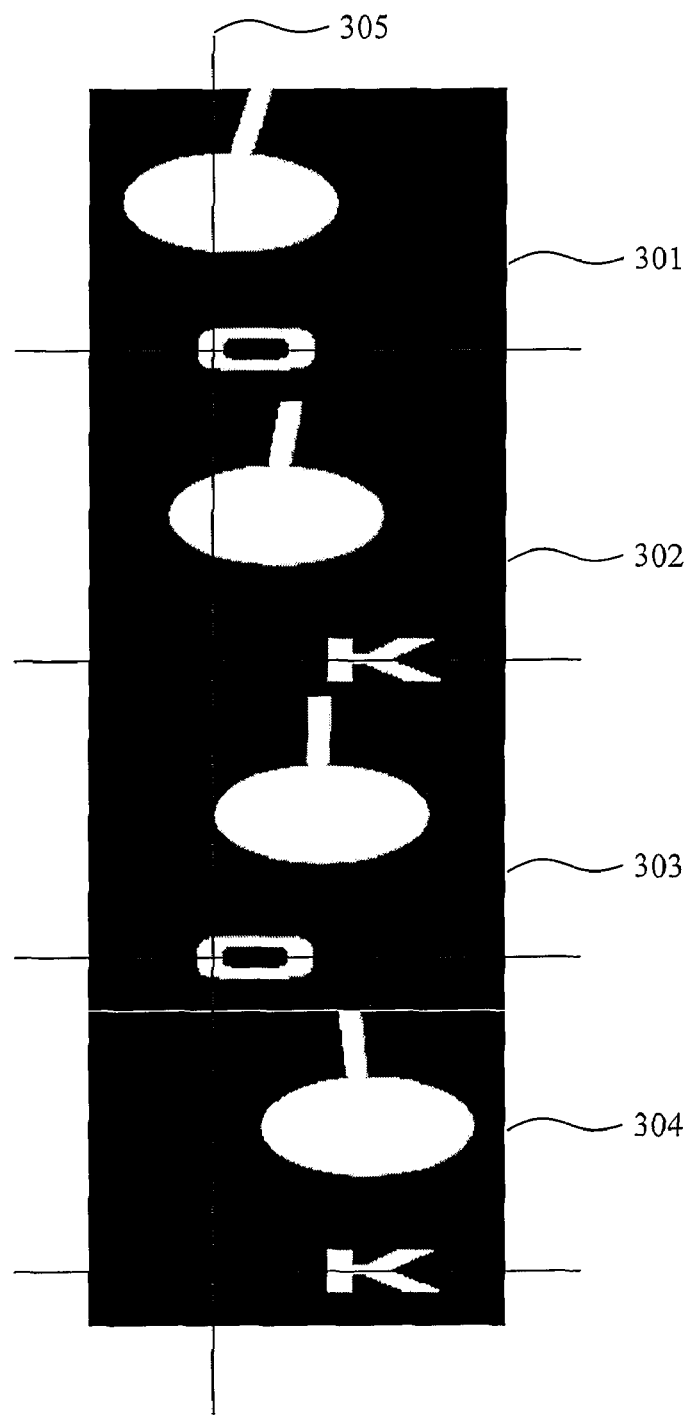
FIG. 3 is another diagram of conventional virtual still.
Figure 4:
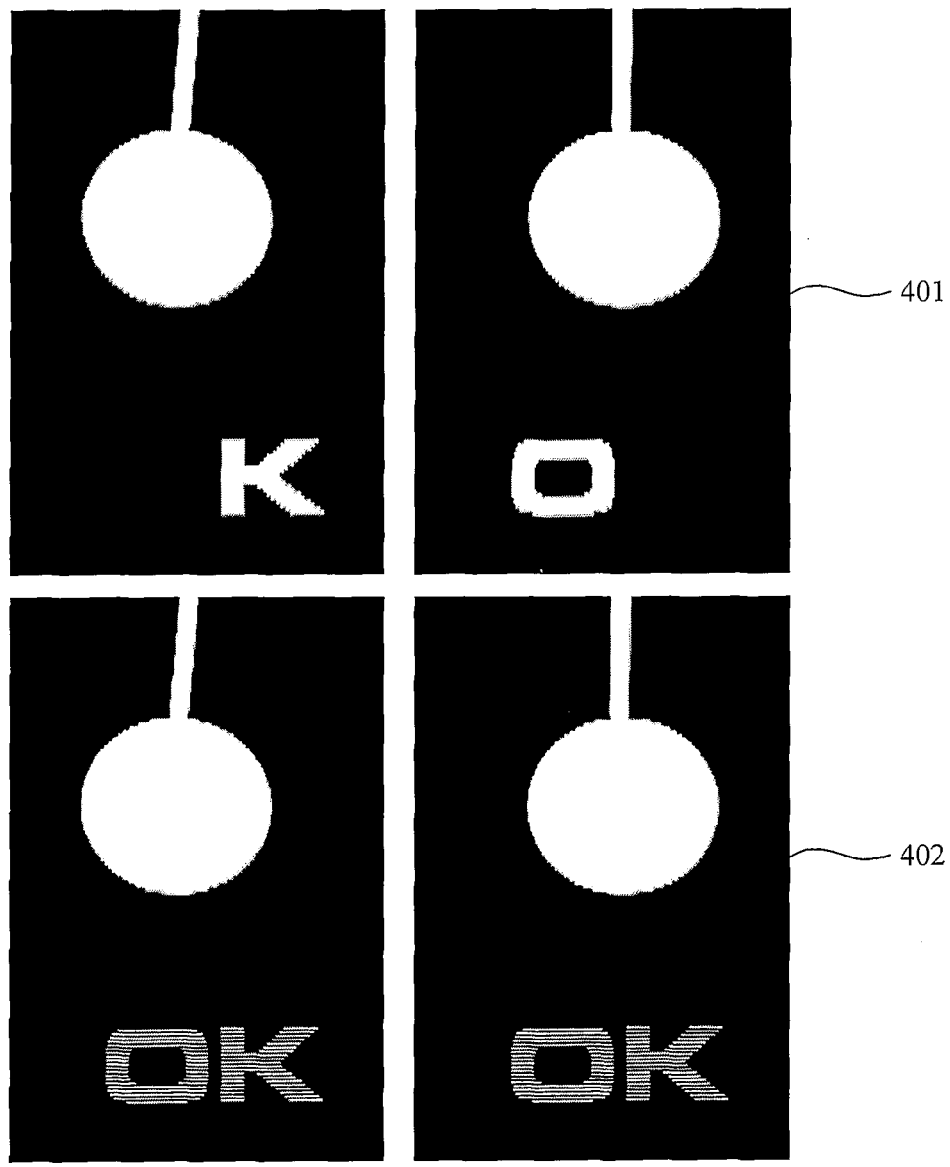
FIG. 4 is a diagram showing the different field results of FIG. 3 by using different video deinterlacing algorithms.

Contrary to the prior art which is limited to correctly deal with one of the cases described with reference to FIG. 1 or FIG. 3, the present invention provides a method and a system for correctly dealing with both the above-mentioned cases, respectively. The embodiment of the present invention is explained with the accompanying figures as follows.

Figure 5:
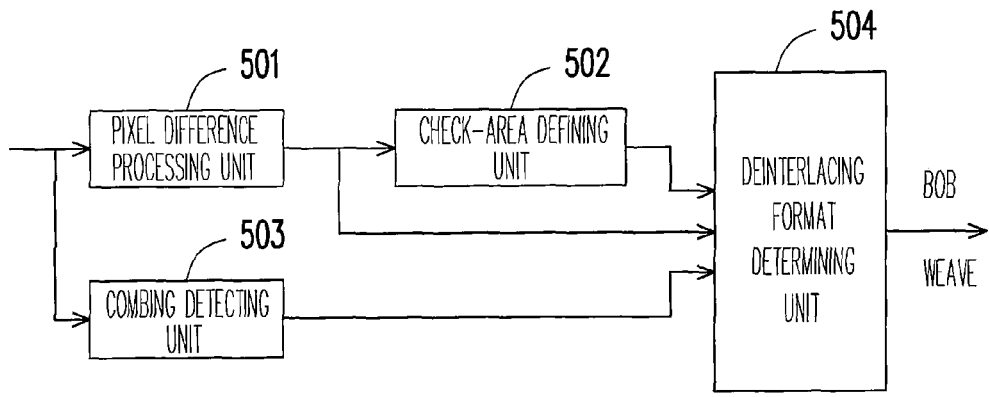
FIG. 5 is a block diagram for the system for determining a video deinterlacing strategy according to an embodiment of the present invention.
Figure 6:
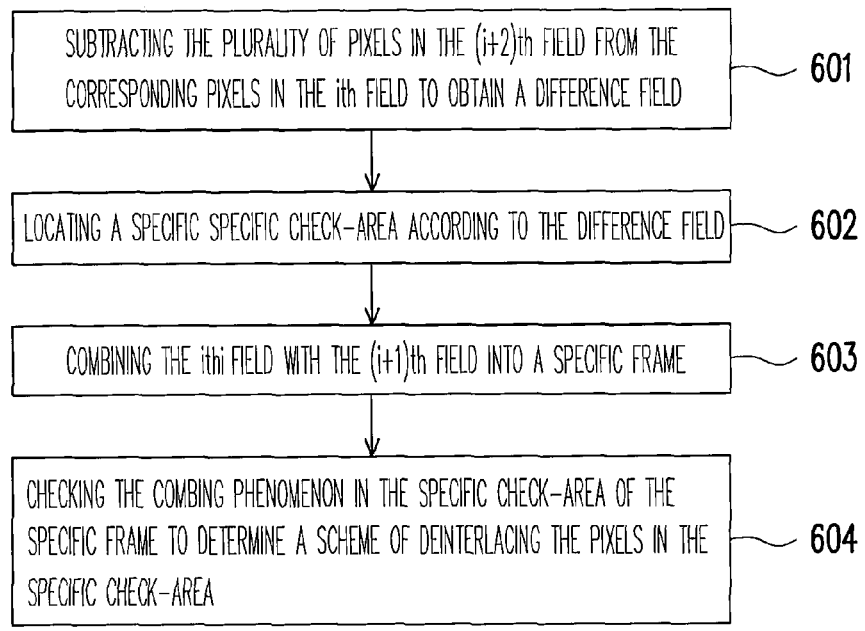
FIG. 6 is a flowchart for the method for determining a video deinterlacing strategy according to an embodiment of the present invention.

FIG. 5 is a block diagram of the system for determining a video deinterlacing strategy according to an embodiment of the present invention. Referring to FIG. 5, the system for determining a video deinterlacing strategy includes a pixel difference processing unit 501, a check-area defining unit 502, a combing detecting unit 503 and a deinterlacing format determining unit 504. FIG. 6 is a flowchart illustrating a method for determining a video deinterlacing strategy according to an embodiment of the present invention. The embodiment of the present invention is explained with the accompanying flowchart of FIG. 6 and system block diagram of FIG. 5 hereinafter.

Figure 1:
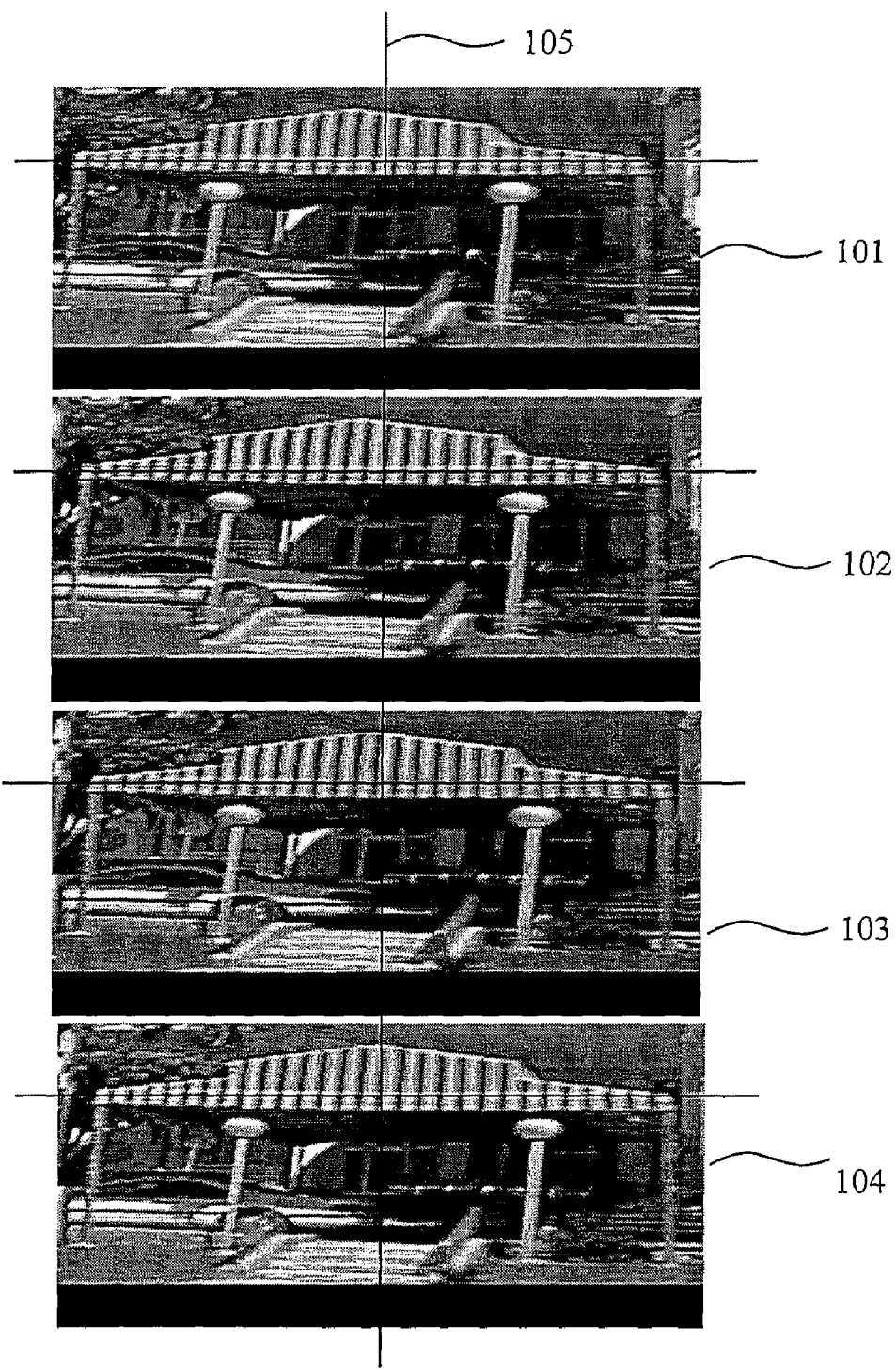
FIG. 1 is a diagram of conventional virtual still.
Figure 2:
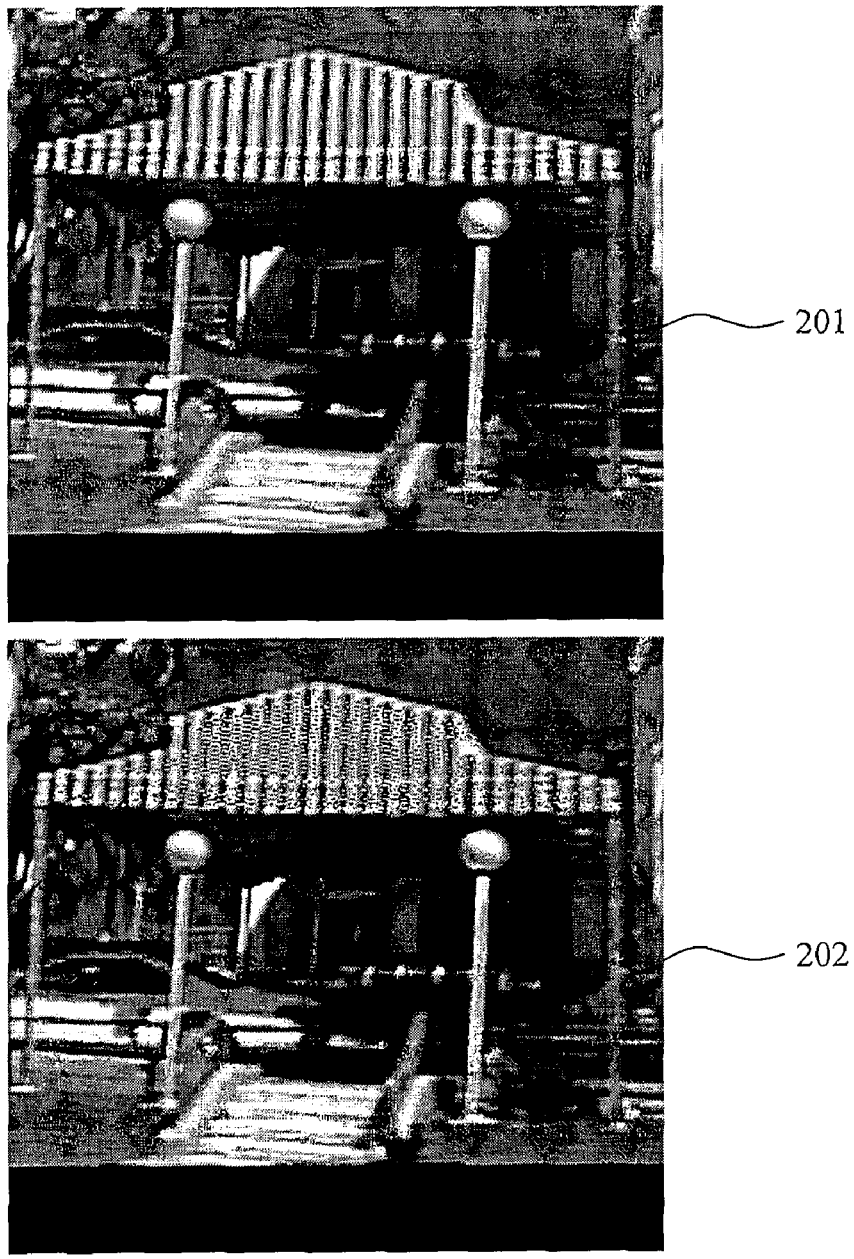
FIG. 2 is a diagram showing the different field results of FIG. 1 by using different video deinterlacing algorithms.
Figure 7:
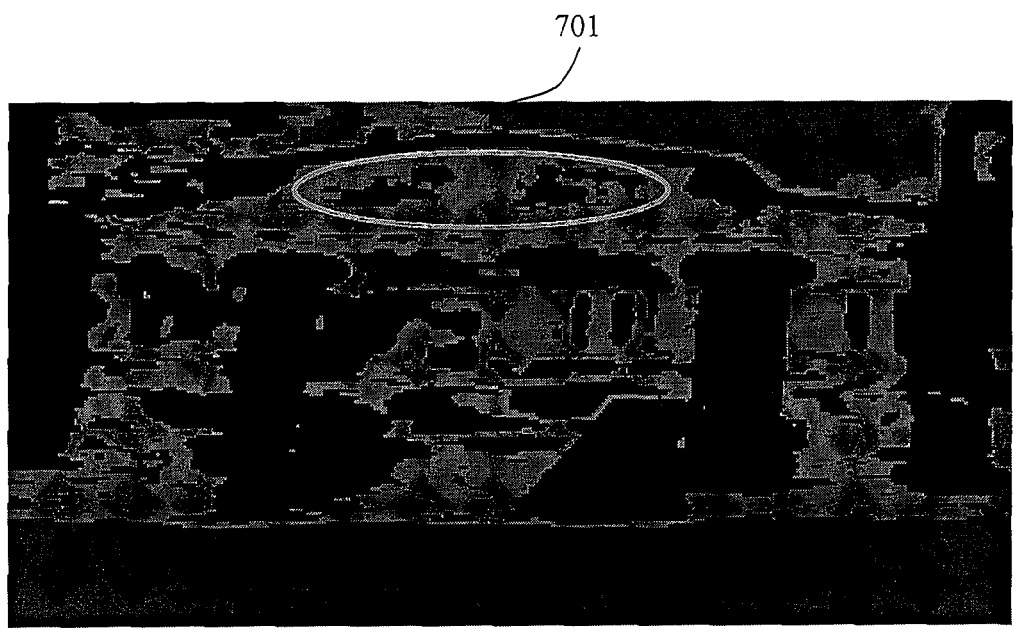
FIG. 7 is a diagram showing a difference field of the field 101 and the field 103 in FIG. 1 according to an embodiment of the present invention.

It is assumed that the system for determining a video deinterlacing strategy according to the embodiment receives four fields 101-104 shown in FIG. 1. First, the pixel difference processing unit 501 performs a subtraction computation on two adjacent odd fields 101 and 103 (or two adjacent even fields), so that all the corresponding pixel pairs in the odd fields 101 and 103 are subtracted by each other and a difference field is obtained as shown by FIG. 7 (step 601). In FIG. 7, a darker portion 701 indicates larger differences of pixel value, while the rest portion, i.e. the lighter portion, indicates smaller differences of pixel value. Herein larger differences of pixel value mean the object comes with a relatively serious motion, while smaller differences of pixel value mean the object comes with a relatively light motion. It can be seen from FIG. 7, the sunroof object comes with less motion.

Figure 8A:
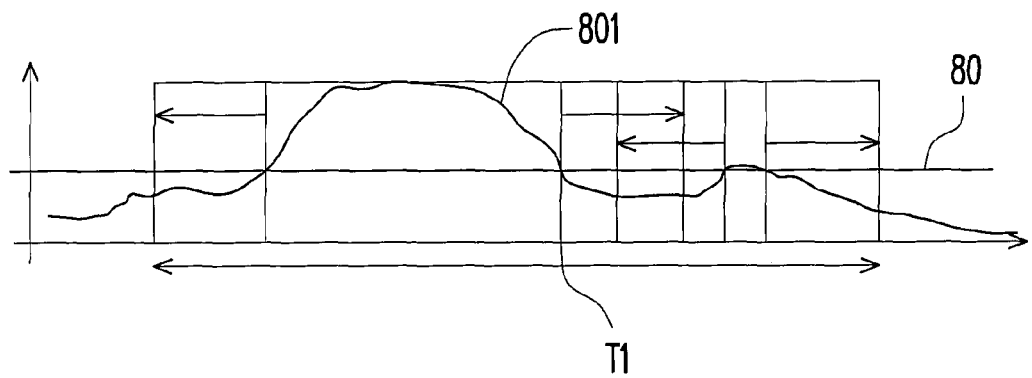
FIGS. 8A and 8B are diagrams showing how the above-mentioned specific check-area is defined.
Figure 8B:
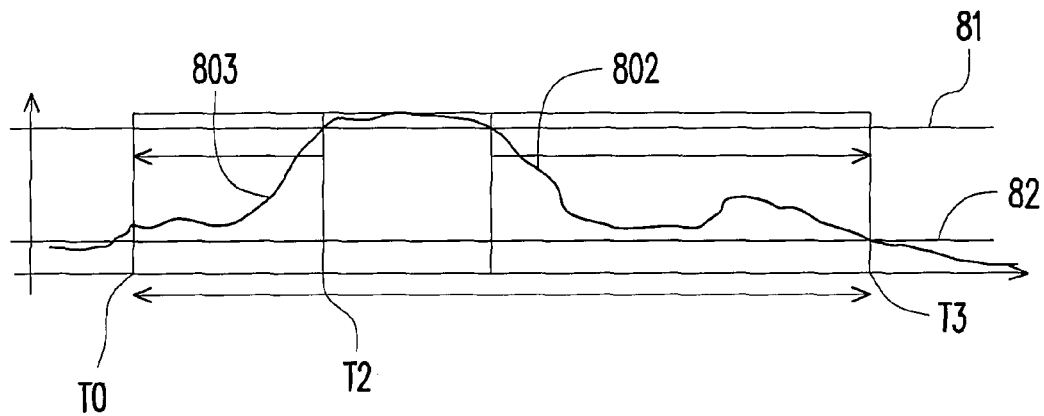

Next, the check-area defining unit 502 receives a difference field, for example, the difference field of FIG. 7, and locates a specific check-area according to the difference field (step 602). It is assumed herein that the difference field received by the check-area defining unit 502 is transferred in serial data mode. That is, the difference field is divided into a plurality of scan lines and the data of each scan line is transferred to the check-area defining unit 502 in serial data mode. FIGS. 8A and 8B are diagrams showing how the above-mentioned specific check-area is defined.

In FIGS. 8A and 8B, the ordinate represents value of the received serial data, while the abscissa represents time. Therefore, the scan line data 801 and 802 in FIGS. 8A and 8B represent all the pixel values of a scan line in FIG. 7, arranged in a timeline from the first pixel to the last pixel.

Referring to FIG. 8A, for the first scheme of defining a specific check-area, a threshold value 80 is specified. When the received scan line data 801 start to exceed the threshold value at the T1 time point, the portion exceeding the threshold value together with the two extension ranges respectively having a preset time length and located prior to and following the portion is defined as a specific check-area. Referring to FIG. 8B, for the second scheme of defining a specific check-area, a higher threshold value 81 and a lower threshold value 82 are specified in FIG. 8B. When the received scan line data 802 start to exceed the higher threshold value 81 at the T2 time point, the data 803 received prior to T2 (i.e. T2-T0) and having a preset time length is defined as a part of the specific check-area, while the data 802 received after T2 but prior to the time point T3 where the received scan line data 802 start to be lower than the lower threshold value 82 is defined as another part of the specific check-area.

Figure 9:
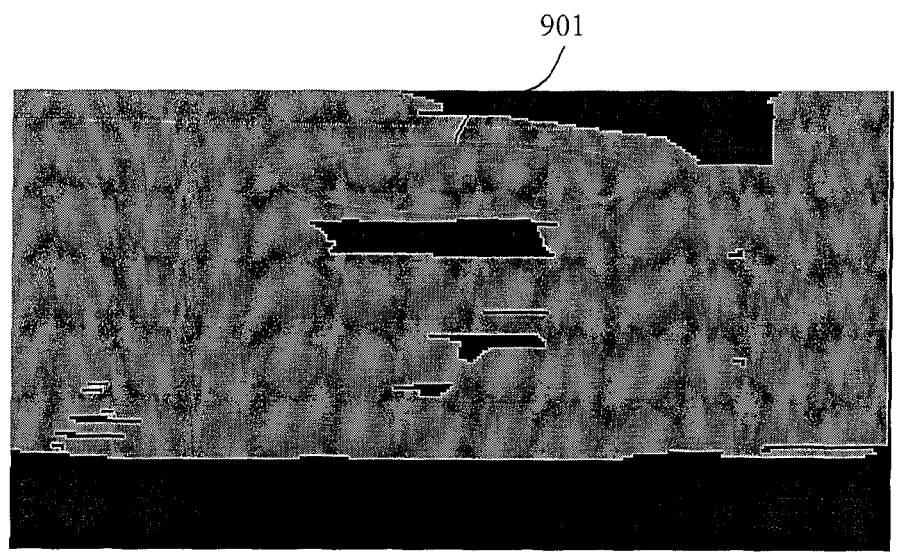
FIG. 9 is a diagram containing the specific check-area of FIG. 7 defined by the check-area defining unit 502.

FIG. 9 is a diagram containing the specific check-area of FIG. 7 defined by the check-area defining unit 502 and with the scheme of step 602, wherein the grey area represents the above-mentioned specific check-area. It can be seen the sunroof portion 901 is covered by the specific check-area.

Figure 10:
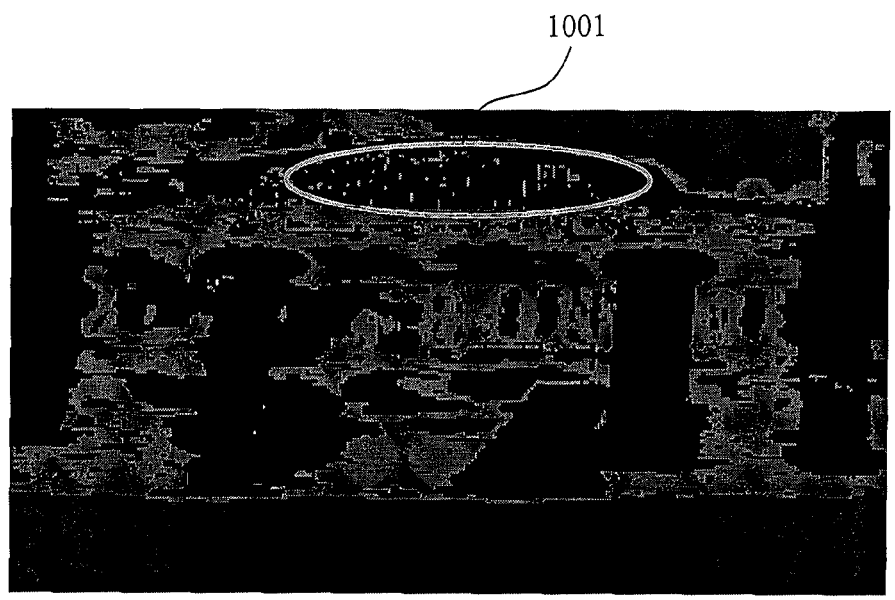
FIG. 10 is a specific frame obtained by combining the field 101 with the field 102 in FIG. 1 to detect whether the pixel combing exists according to an embodiment of the present invention.

Further, the field 101 is combined with the field 102 into a specific frame (step 603). According to the embodiment of the present invention shown in FIG. 5, the combing detecting unit 503 receives the fields 101 and 102 and combines them into a frame. The detection result of combing after the combining is shown by FIG. 10 where the black portion indicates a combing phenomenon occurs. Note that the sunroof area after combining the two successive fields in FIG. 10 exhibits a serious combing phenomenon.

Furthermore, the check result of combing phenomenon shown by FIG. 10 is output and in coordination with the defined specific check-area, a scheme of deinterlacing fields is determined (step 604). According to the embodiment of the present invention shown in FIG. 5, the deinterlacing format determining unit 504 receives the check result of combing phenomenon of the specific frame output from the above-mentioned combing detecting unit 503 after the check-area defining unit 502 checks the combing phenomenon therein. Herein although the pixel difference processing unit 501 has determined the pixels in the specific check-area of the above-mentioned successive fields 101-104 are in still, however, a re-check on the pixels in the specific check-area according to the embodiment indicates some pixels likely come with combing. In response to the re-check result, a "bob" deinterlacing processing is performed on the suspicious pixels, while a "motion adaptive" deinterlacing processing is performed on other pixels without combing in the specific check-area based on the pixel difference values provided by the pixel difference processing unit 501. The pixels outside the specific check-area are processed in the same way.

Figure 15:
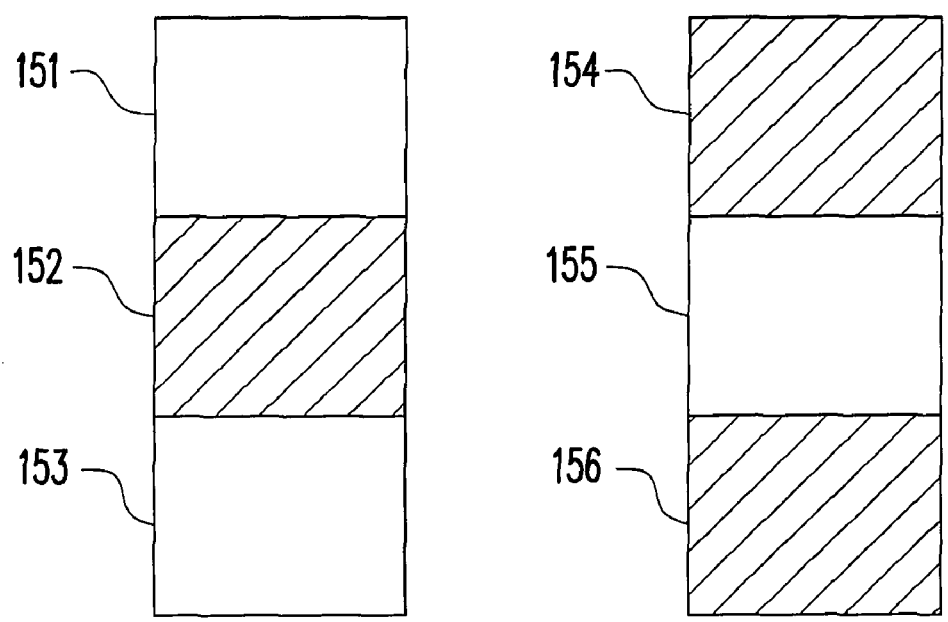
FIG. 15 is a diagram of conventional combing.
Figure 16A:
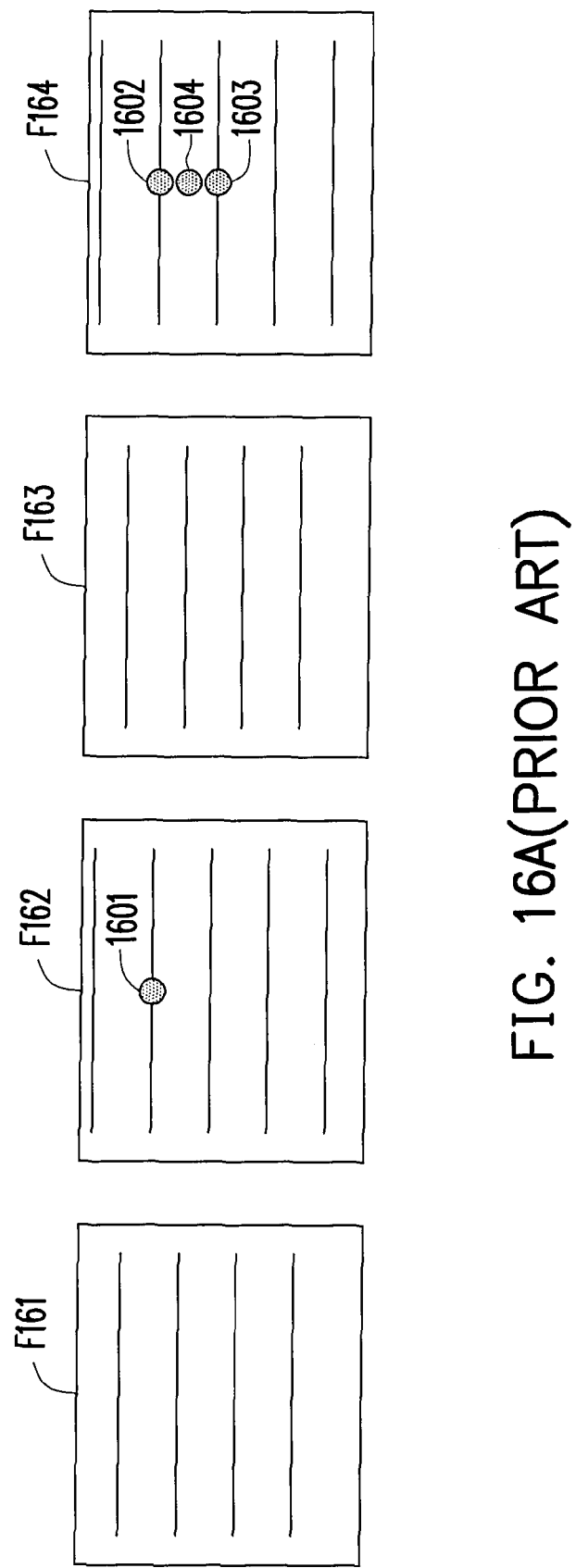
FIG. 16A is a diagram showing the conventional frame motion detection method.
Figure 16B:
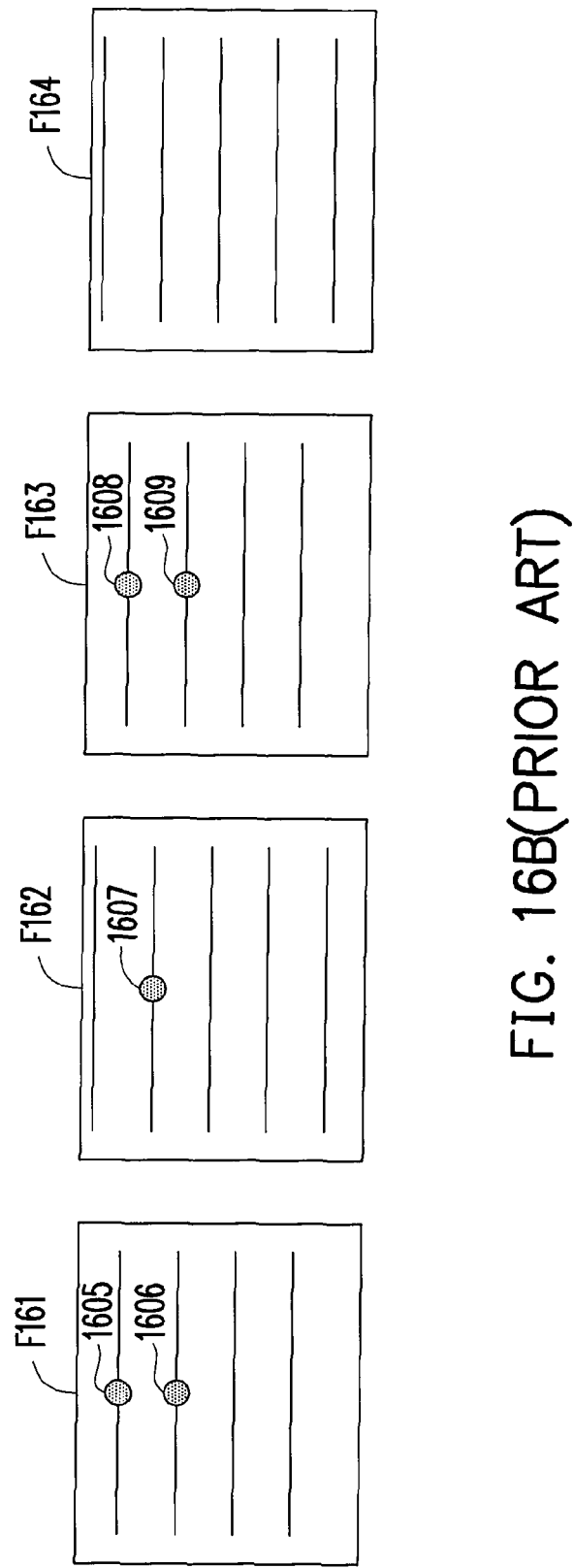
FIG. 16B is a diagram showing the conventional field motion detection method.

Note that although the step 603 of the above-mentioned embodiment provides the scheme of combining the field 101 with the field 102 only, however, in addition to the described scheme of combining the field 101 with the field 102, one skilled in the art would understand that the combing detecting unit 503 can detect combing in advance, wherein the alternative detection scheme is, for example, to detect every three vertically-adjacent pixels in the combined frame of the fields 101 and 102 to see whether any of the two cases in FIG. 15 is applicable thereto: the first case indicates the three pixels, for example, P151, P152 and P153, exhibit a "bright-dark-bright" pattern; the second case indicates the three pixels, for example, P154, P155 and P156, exhibit a "dark-bright-dark" pattern. Once the combing detecting unit 503 gets the detection result in advance ready, the detection result would be sent to the deinterlacing format determining unit 504, and the deinterlacing format determining unit 504 would determine how the pixels in the above-mentioned specific check-area are processed for deinterlacing.

One skilled in the art would understand that the steps 602 and 603 may be processed in parallel, although the step 603 is processed after the step 602 in above embodiment. The sequence of these steps is illustrated for explanation, and the scope of this invention should not limit to this embodiment.

Figure 11:
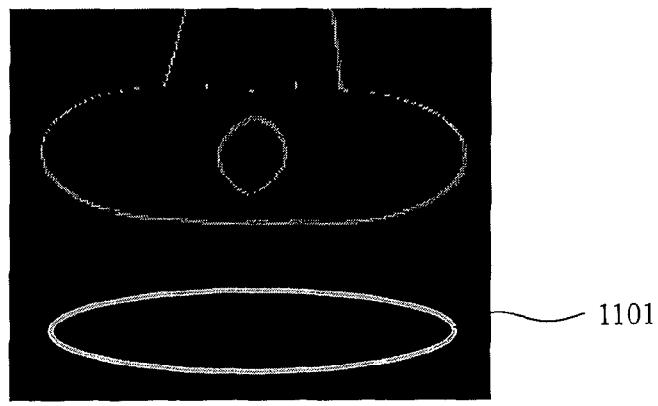
FIG. 11 is a diagram showing a difference field of the field 301 and the field 303 in FIG. 3 according to an embodiment of the present invention.

The embodiment described with reference to FIGS. 5 and 6 is also suitable for the deinterlacing processing on the fields in the embodiment of FIG. 3. Referring to FIGS. 3, 5 and 6, first, the pixel difference processing unit 501 performs a subtraction computation on two adjacent odd fields 301 and 303 (or two adjacent even fields), so that all the corresponding pixel pairs in the odd fields 301 and 303 are subtracted by each other and a difference field is obtained as shown by FIG. 11 (step 601). In FIG. 11, the "OK" portion is almost in no motion. Hence, the pixels of the "OK" portion are accordingly judged as "still" (which means a "weave" processing applies).

Figure 12:
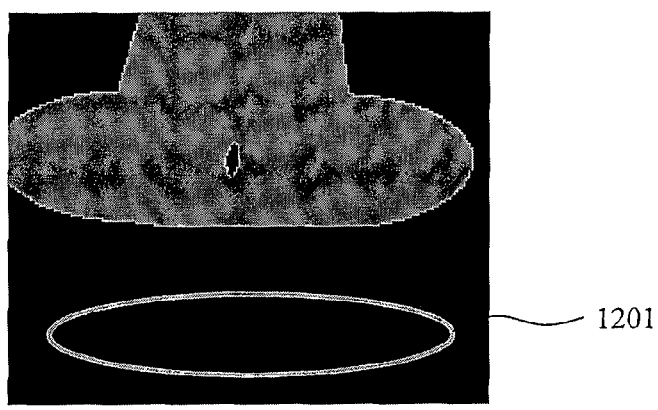
FIG. 12 is a diagram containing the specific check-area of FIG. 11 defined by the check-area defining unit 502.

Next, the check-area defining unit 502 receives a difference field, for example, the difference field of FIG. 11, and locates a specific check-area according to the difference field (step 602). Following the definition scheme shown by FIGS. 8A and 8B, a specific check-area, as shown by the grey portion in FIG. 12, is defined. It can be seen from FIG. 12 that, the "OK" portion does not fall in the specific check-area; instead, the portion showing the single pendulum swing falls in the specific check-area.

Figure 13:
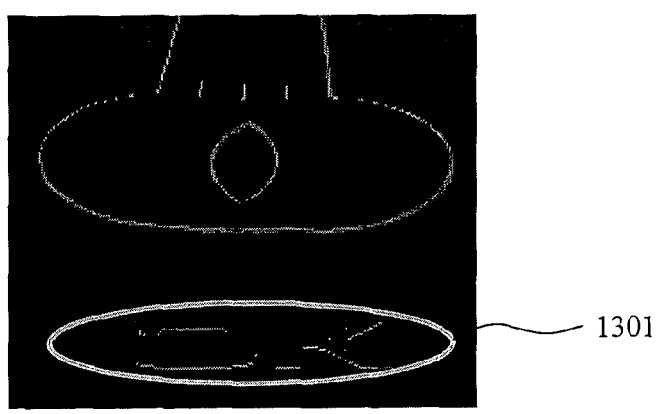
FIG. 13 is a specific frame obtained by combining the field 301 with the field 302 in FIG. 3 to detect whether the pixel combing exists according to an embodiment of the present invention.
Figure 14:
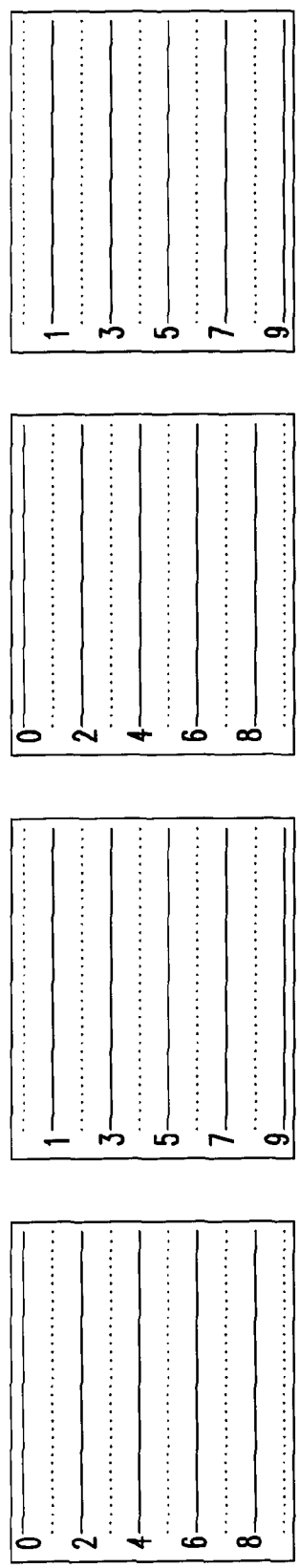
FIG. 14 is a diagram of conventional even fields and odd fields.

Further, the field 301 is combined with the field 302 into a specific frame (step 603). For the embodiment of FIG. 5, the combing detecting unit 503 receives the fields 301 and 302 and combines them into a frame. The detection result of combing after the combining is shown in FIG. 13 where the black portion indicates a combing phenomenon occurs. Note that the area 1301 containing the "OK" mark after combining the two successive fields exhibits a combing phenomenon with "bright-dark" interlaced stripes. Since the portion is not included in the specific check-area, the pixels thereof would be judged as "still" in accordance with the previous result. Furthermore, the deinterlacing format determining unit 504 receives the specific frame output from the above-mentioned combing detecting unit 503 and the combing phenomenon of the specific frame is checked based on the specific check-area defined by the check-area defining unit 502, wherein since the area 1301 with "OK" mark is outside the specific check-area, the check result is still counted as the judgment result of the pixel difference processing unit 501 and a "weave" processing is accordingly performed on the area 1301 with "OK" mark (step 604). In this way, the frame flicker fault of the prior art may be overcome.

Although the step 603 of the above-mentioned embodiment provides the scheme of combining the field 301 with the field 302 only, however, in addition to the scheme of combining the field 301 with the field 302 as described in the above-mentioned embodiment, one skilled in the art would understand that the combing detecting unit 503 is able to detect combing in advance the same way as previously described. After that, the deinterlacing format determining unit 504 checks the defined specific check-area so as to judge which deinterlacing processing should be performed on the pixels in the specific check-area.

In summary, since the present invention uses the difference field to locate the specific check-area, checks the combing phenomenon of the specific check-area in the frame synthesized by the adjacent fields and determines a proper deinterlacing scheme of the fields, thus, the present invention is able to make a correct judgment on the video deinterlacing strategy, to promote the video quality and thereby resolve the problem of the prior art.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for determining a video deinterlacing scheme, comprising:

subtracting a plurality of pixels in a (i+2)th field from corresponding pixels in an ith field to obtain a difference field, wherein the difference field is divided into a plurality of scan lines, and a plurality of pixels of each scan line are transferred in series;

locating a part region of the difference field to obtain a specific check-area, wherein the specific check-area is defined according to a plurality of pixel values of the pixels of each scan line and a preset time length during which the plurality of pixel values would exceed a predetermined threshold;

combining the ith field with a (i+1)th field or combining the (i+1)th field with the (i+2)th field into a specific frame; and checking a combing phenomenon of the specific check-area in the specific frame to determine the video deinterlacing scheme for pixels in the specific check-area, wherein i is a natural number;

wherein the step of "locating a part region of the difference field to obtain a specific check-area" comprises:

when the pixel values of the pixels of each scan line start to exceed a first preset value, an area which exceeds the first preset value plus two extension ranges respectively having the preset time length and located prior to and following the area is defined as the specific check-area;

wherein a pre-deinterlacing scheme according to the difference field is judged in advance.

2. The method for determining a video deinterlacing scheme according to claim 1, wherein the step of "locating a part region of the difference field to obtain a specific check-area" comprises:

when the pixel values of the pixels of each scan line start to exceed a first preset value at a first time point, the pixels prior to the first time point and having the preset time length are defined as a part of the specific check-area: and when the pixel values of the pixels of each scan line start to be lower than a second preset value at a second time point, the pixels between the first time point and the second time point are defined as another part of the specific check-area.

3. The method for determining a video deinterlacing scheme according to claim 1, wherein when the combing phenomenon of the specific check-area in the specific frame is less than a first preset value, a pre-deinterlacing scheme is used as the video deinterlacing scheme.

4. The method for determining a video deinterlacing scheme according to claim 1, wherein when the combing phenomenon of the specific check-area in the specific frame is greater than a second preset value, another pre-deinterlacing scheme is used as the video deinterlacing scheme.

5. The method for determining a video deinterlacing scheme according to claim 1, wherein the ith field and (i+1)th field are different types of fields.

6. The method for determining a video deinterlacing scheme according to claim 1, wherein the ith field and (i+2)th field are same type of fields.

7. A system for determining a video deinterlacing scheme, comprising:
   a pixel difference processing unit, for receiving an ith field and a (i+2)th field and subtracting plurality of pixels in the (i+2)th field from corresponding pixels in the ith field to obtain a difference field, wherein the difference field is divided into a plurality of scan lines and a plurality of pixels of each scan line are transferred in series;
   a check-area defining unit, coupled to the pixel difference processing unit, for receiving the field pixels of each scan line in series and locating a part region of the difference field to obtain a specific check-area, wherein the check-area defining unit uses a plurality of pixel values of the pixels of each scan line and a preset time length during which the pixel values would exceed a predetermined threshold in order to define the specific check-area;
   a combing detecting unit, for receiving the ith field and the (i+1)th field and combining the ith field with the (i+1)th field into a specific frame; and
   a deinterlacing format determining unit, coupled to the pixel difference processing unit and used for checking the check-area defining unit and the combing detecting unit and determining the video deinterlacing scheme for pixels in the specific check-area according to a detection result of a combing phenomenon of the specific check-area in the specific frame, wherein i is a natural number; when the pixel values of the pixels of each scan line received by the check-area defining unit start to exceed a first preset value, the check-area defining unit defines an area exceeding the first preset value plus two extension ranges respectively having the preset time length and located prior to and following the area as the specific check-area.

8. The system for determining a video deinterlacing scheme according to claim 7, wherein when the pixel values of the pixels of each scan line received by the check-area defining unit start to exceed a first preset value at a first time point, the check-area defining unit defines the pixels prior to the first time point and having the preset time length as a part of the specific check-area, and when the pixel values of the pixels of each scan line received by the check-area defining unit start to be lower than a second preset value at a second time point, the check-area defining unit defines the pixels between the first time point and the second time point as another part of the specific check-area.

9. The system for determining a video deinterlacing scheme according to claim 7, wherein when the combing phenomenon of the specific check-area in the specific frame is less than a first preset value, the deinterlacing format determining unit determines to use a pre-deinterlacing scheme judged according to the difference field.

10. The system for determining a video deinterlacing scheme according to claim 7, wherein when the combing phenomenon of the specific check-area in the specific frame is greater than a second preset value, the deinterlacing format determining unit determines to use a bob deinterlacing scheme.

11. The system for determining a video deinterlacing scheme according to claim 7, wherein the ith field and (i+1)th field are different types of fields.

12. The system for determining a video deinterlacing scheme according to claim 7, wherein the ith field and the (i+2)th field are same types of fields.

* * * * *